July 19, 1932.　　　T. F. GRAY ET AL　　　1,868,059

STEAM, HYDRAULIC, AND LIKE VALVE

Filed Aug. 28, 1931　　3 Sheets-Sheet 3

INVENTORS:
J. F. Gray
E. A. Bolton
By: Marks & Clerk
Attys.

Patented July 19, 1932

1,868,059

UNITED STATES PATENT OFFICE

TOM FREDERICK GRAY AND EDGAR ANDREW BOLTON, OF ADSWOOD, STOCKPORT, ENGLAND, ASSIGNORS TO VICTORY VALVES LIMITED, OF ADSWOOD, STOCKPORT, ENGLAND, A BRITISH COMPANY

STEAM, HYDRAULIC, AND LIKE VALVE

Application filed August 28, 1931, Serial No. 559,983, and in Great Britain April 30, 1931.

This invention relates to steam, hydraulic and like valves, and particularly to valves of the type having an internal cover piece upon the valve body, such cover piece when removed leaving a gap or aperture which serves for the inspection, the insertion and the withdrawal of the valve and seat.

Our present invention comprises the provision of an improved construction and arrangement of the cover piece and its securing means which strengthen the valve body against any distortion at the said gap or aperture and allow of the ready refacing of the cover piece to ensure a good joint with the valve body.

Referring to the accompanying explanatory drawings:—

The same reference letters in the different views indicate the same parts.

Figure 1:
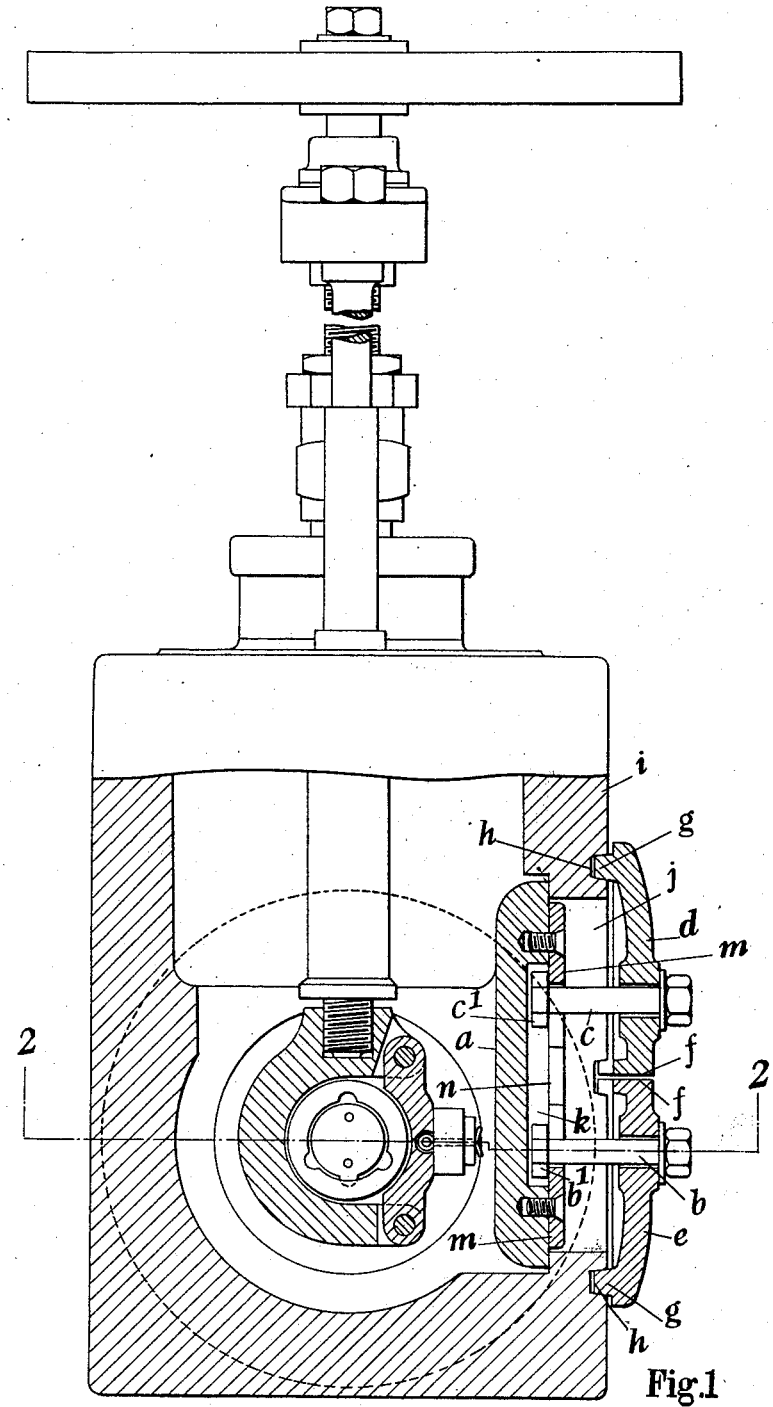
Figure 1 is a part sectional elevation, Figure 2 a sectional plan view on the line 2—2 of Figure 1, and Figure 3 an elevation looking from right to left of Figure 1 showing a parallel slide valve having our invention applied thereto.
Figure 2:
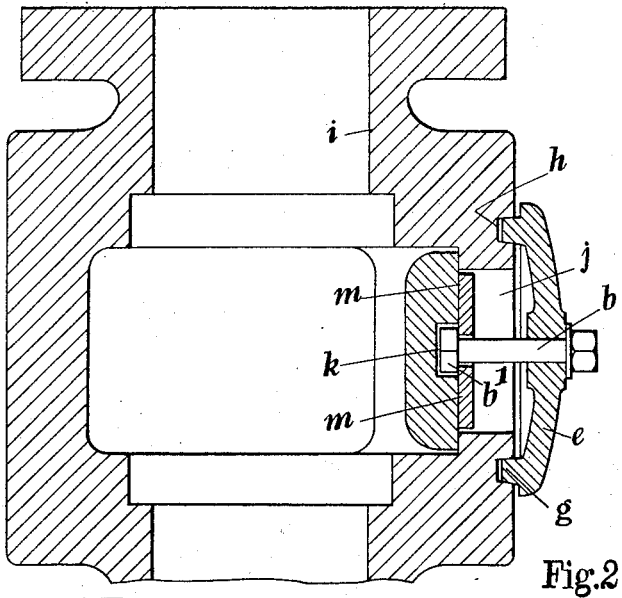
Figure 3:
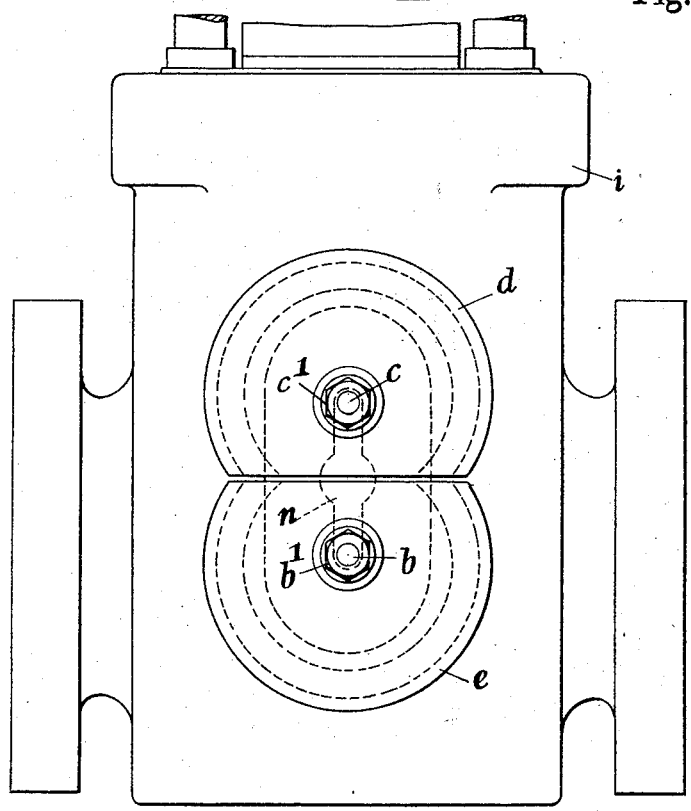
Figure 4:
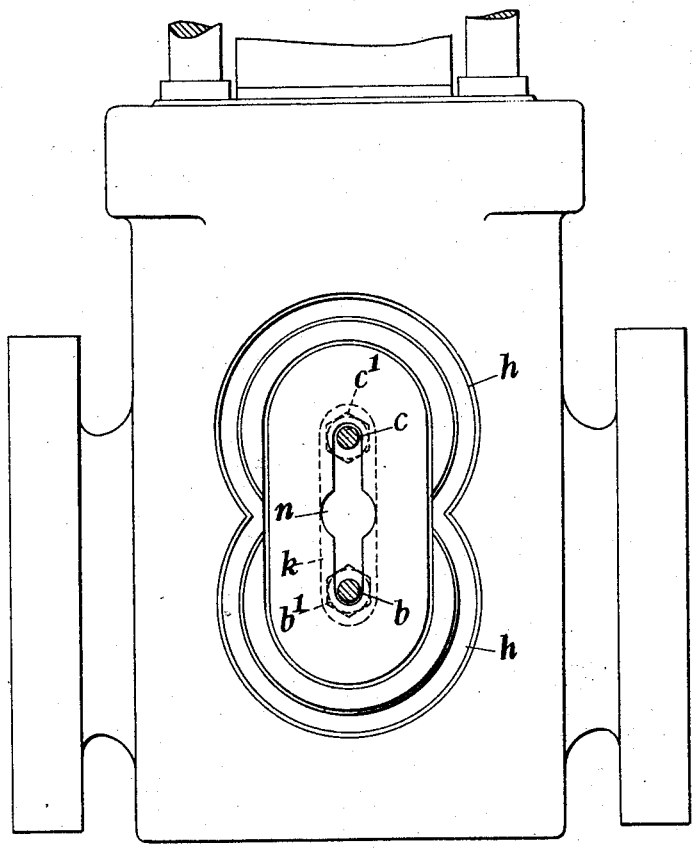
Figure 4 is a view similar to Figure 3 but with the external plates by which the internal cover piece is held in position, removed.
Figure 5:
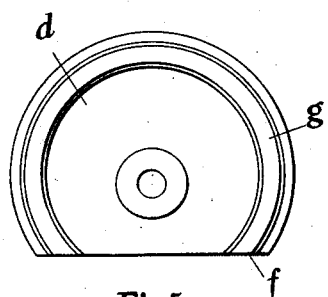
Figure 5 is an elevation of one of the external plates looking from left to right of Figures 1 and 2.

The internal cover piece $a$ is held in position by two bolts $b$, $c$ which pass through two plates $d$, $e$ which are of substantially circular form in plan with a flat part $f$ (see Figure 5) where the two plates come against one another when in position on the valve body. Each of the plates $d$, $e$ has a ridge or band $g$ of wedge shape in section which projects from the plate at one side around and adjacent to the circular edge and such ridge or band enters a groove or recess $h$ in the valve body $i$ around the gap or aperture $j$ closed by the internal cover piece $a$. As each groove or recess is of annular or circular form, it can be readily machined in the body and the ridge or band $g$ upon each plate be made a good fit therein to ensure that when the bolts $b$ and $c$ holding the cover plate $a$ in position are tightened, the body of the valve around the cover plate aperture $i$ is gripped by the external plates $d$ and $e$, and thereby strengthened against distortion by a movement tending to cause either contraction or expansion of the body of the aperture.

The aperture $j$ closed by the internal cover piece $a$ is of elliptical shape or has parallel sides and rounded ends as shown, with the two part circular grooves $h$ around its edge as before described.

Each of the external plates $d$, $e$ has one of the bolts $b$ or $c$ extending therethrough. The cover piece $a$ has a groove $k$ across its face into which the bolt heads $b^1$, $c^1$ project and detachable strips $m$ upon the cover piece serve to hold the bolts in such grooves, producing in effect undercut or T grooves at the opposite sides of an enlarged hole $n$ through which the bolt heads are inserted into and removed from the grooves. By making the strips $m$ detachable from the cover piece $a$, the jointing face of the latter can be readily retrued on a flat surface plate without any special machines being necessary for the purpose, as the whole of the cover piece face is free from projections which would interfere with this operation.

What we claim is:—

1. In steam, hydraulic and like valves having an internal cover piece upon an aperture in the valve body, the arrangement wherein the cover piece is held in position by bolts passing through two external plates, each of the latter having a ridge or band of wedge shape in cross section and of a circular form projecting from one side thereof and entering a corresponding groove or recess in the valve body around the aperture closed by the cover piece whereby the valve body is strengthened at such aperture against both expansion and contraction.

2. In valves as claimed in claim 1, the formation of each external plate of circular shape with a flat side at the part where the two plates come against one another when in position on the valve body.

3. In valves as claimed in claim 1, the provision of a slot in the cover piece and of detachable strips at each side of said slot, to receive the heads of the securing bolts of the cover piece and to enable the cover piece jointing face to be trued on a flat surface plate.

In testimony whereof we have signed our names to this specification.

TOM FREDERICK GRAY.
EDGAR ANDREW BOLTON.